(12) United States Patent
Yamamotoya et al.

(10) Patent No.: US 9,713,946 B2
(45) Date of Patent: Jul. 25, 2017

(54) STRUT-TYPE SUSPENSION AND COMPRESSION COIL SPRING FOR SUSPENSION

(71) Applicant: NHK SPRING CO., LTD., Yokohama-shi, Kanagawa (JP)

(72) Inventors: Kenji Yamamotoya, Manesar (IN); Hideto Enomoto, Yokohama (JP); Ken Takahashi, Yokohama (JP); Toshiaki Sato, Yokohama (JP); Mitsuhiro Sugiyama, Yokohama (JP); Yoshio Kobayashi, Yokohama (JP); Taichi Inage, Yokohama (JP); Tomotake Kato, Yokohama (JP); Akihiko Nishikawa, Wolfsburg (DE); Masahiro Umezawa, Yokohama (JP); Michihiko Ayada, Yokohama (JP); Suguru Kajigaya, Yokohama (JP)

(73) Assignee: NHK SPRING CO., LTD., Yokohama-Shi, Kanagawa (JP)

( * ) Notice: Subject to any disclaimer, the term of this patent is extended or adjusted under 35 U.S.C. 154(b) by 31 days.

(21) Appl. No.: 14/702,919

(22) Filed: May 4, 2015

(65) Prior Publication Data

US 2015/0251514 A1    Sep. 10, 2015

Related U.S. Application Data

(63) Continuation of application No. PCT/JP2013/080810, filed on Nov. 14, 2013.

(30) Foreign Application Priority Data

Nov. 16, 2012  (JP) .................................. 2012-252519

(51) Int. Cl.
| | | |
|---|---|---|
| B60G 15/06 | (2006.01) | |
| B60G 11/14 | (2006.01) | |
| F16F 1/04 | (2006.01) | |

(52) U.S. Cl.
CPC ............ B60G 15/062 (2013.01); B60G 11/14 (2013.01); F16F 1/043 (2013.01);
(Continued)

(58) Field of Classification Search
CPC .... B60G 11/14; B60G 15/062; B60G 15/063; F16F 1/06; F16F 1/04; F16F 1/041; F16F 1/042
(Continued)

(56) References Cited

U.S. PATENT DOCUMENTS 3,727,940 A   4/1973  Hug
5,620,171 A   4/1997  Wakatsuki
(Continued)

FOREIGN PATENT DOCUMENTS

DE   3743451 A1   6/1989
FR   2097109 A1   3/1972
(Continued)

OTHER PUBLICATIONS

Chinese Office Action (and English translation thereof) dated May 30, 2016, issued in counterpart Chinese Application No. 201380059997.1.
(Continued)

Primary Examiner — Melanie Torres Williams
(74) Attorney, Agent, or Firm — Holtz, Holtz & Volek PC

(57) ABSTRACT

A strut-type suspension includes a compression coil spring, a lower spring seat, an upper spring seat, and a shock absorber. The compression coil spring is disposed at a position offset to the outer side of a vehicle with respect to the shock absorber. The compression coil spring is mounted (Continued)

in a vehicle body in such a state that it is compressed between spring seats. The compression coil spring includes a large-diameter wire portion and a small-diameter wire portion. The large-diameter wire portion is provided in a vehicle inner-side portion of the compression coil spring. The small-diameter wire portion is provided in a vehicle outer-side portion. A wire diameter of the large-diameter wire portion is greater than a wire diameter of the small-diameter wire portion.

5 Claims, 4 Drawing Sheets

(52) U.S. Cl.
CPC .... *B60G 2200/142* (2013.01); *B60G 2202/12* (2013.01); *B60G 2202/312* (2013.01); *B60G 2206/42* (2013.01); *B60G 2206/426* (2013.01)

(58) Field of Classification Search
USPC ......................................... 267/220, 221, 170
See application file for complete search history.

(56) References Cited

U.S. PATENT DOCUMENTS

| | | | |
|---|---|---|---|
| 6,199,882 B1 | 3/2001 | Imaizumi et al. | |
| 6,398,201 B1* | 6/2002 | Solomond | F16F 1/126 |
| | | | 267/170 |
| 7,806,392 B2 | 10/2010 | Ishikawa | |
| 2002/0113353 A1 | 8/2002 | Erhardt et al. | |
| 2003/0111781 A1* | 6/2003 | Imaizumi | B60G 15/063 |
| | | | 267/166 |
| 2003/0209395 A1* | 11/2003 | Fukaya | B60G 11/14 |
| | | | 188/322.12 |
| 2007/0170684 A1* | 7/2007 | Ohkita | B60G 15/063 |
| | | | 280/124.147 |
| 2009/0230640 A1* | 9/2009 | Michel | B60G 15/063 |
| | | | 280/6.157 |

FOREIGN PATENT DOCUMENTS

| | | | | |
|---|---|---|---|---|
| JP | 59219534 A | 12/1984 | | |
| JP | 2000103216 A | 4/2000 | | |
| JP | 2002067647 A | 3/2002 | | |
| JP | WO 0240299 A1 * | 5/2002 | ......... | B60G 15/063 |
| JP | 2004150637 A | 5/2004 | | |
| JP | 2004216922 A | 8/2004 | | |
| JP | 2005155756 A | 6/2005 | | |
| JP | 2006194426 A | 7/2006 | | |
| JP | 2010164071 A | 7/2010 | | |
| KR | 19920004764 B1 | 6/1992 | | |
| KR | 1020080008468 A | 1/2008 | | |

OTHER PUBLICATIONS

Korean Office Action (and English translation thereof) dated Jun. 30, 2016, issued in counterpart Korean Application No. 10-2015-7012767.
International Search Report (ISR) dated Dec. 24, 2013 issued in International Application No. PCT/JP2013/080810.
International Preliminary Report on Patentability (IPRP) including Written Opinion (in English) dated May 28, 2015, issued in International Application No. PCT/JP2013/080810.
Extended European Search Report dated Jun. 23, 2016, issued in counterpart European Application No. 13855147.8.
Korean Office Action (and English translation thereof) dated Mar. 29, 2017 issued in counterpart Korean Application No. 2017-7001885.

* cited by examiner

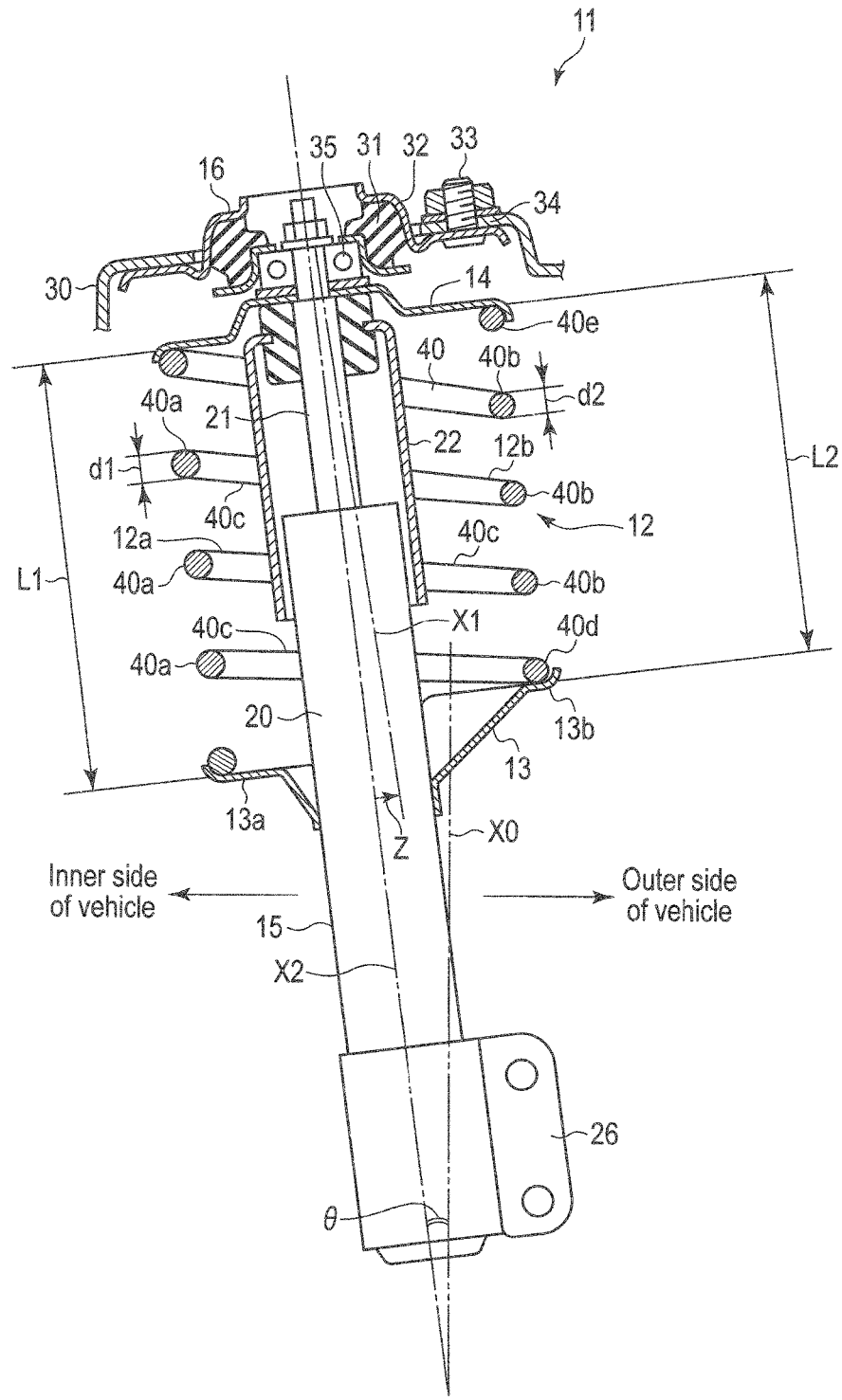
F I G. 2

STRUT-TYPE SUSPENSION AND COMPRESSION COIL SPRING FOR SUSPENSION

CROSS REFERENCE TO RELATED APPLICATIONS

This application is a Continuation Application of PCT Application No. PCT/JP2013/080810, filed Nov. 14, 2013 and based upon and claiming the benefit of priority from prior Japanese Patent Application No. 2012-252519, filed Nov. 16, 2012, the entire contents of all of which are incorporated herein by reference.

BACKGROUND OF THE INVENTION

1. Field of the Invention

The present invention relates to a strut-type suspension used in a vehicle such as a car, and a suspension compression coil spring for use in the suspension.

2. Description of the Related Art

Patent Document 1 (Jpn. Pat. Appln. KOKAI Publication No. 2000-103216) or Patent Document 2 (Jpn. Pat. Appln. KOKAI Publication No. 2004-150637) discloses a strut-type suspension which is used in a vehicle such as a car. In these strut-type suspensions, a compression coil spring, a lower spring seat, an upper spring seat, and a shock absorber are provided. The compression coil spring serves as a suspension spring. The lower spring seat is disposed on the lower end side of the compression coil spring. The upper spring seat is disposed on the upper end side of the compression coil spring. The shock absorber passes through the inside of the compression coil spring. The shock absorber includes elements such as a cylinder in which fluid is accommodated, a rod which is inserted into the cylinder to be freely extended and retracted, and a damping force generation mechanism. The damping force generation mechanism has the function of attenuating the extending and retracting movement of the rod.

In order to reduce sliding resistance that is produced between the cylinder and the rod of the shock absorber, in Patent Document 1, the position of a coil central axis of the compression coil spring is offset to the outer side of the vehicle with respect to the shock absorber. In the shock absorber of Patent Document 2, a pitch angle of the compression coil spring is varied in accordance with a position of turns of a wire from an end.

In this field, from a standpoint of reducing the weight of a vehicle, reducing the weight of a compression coil spring for suspension (hereinafter referred to as a suspension compression coil spring) is strongly desired. It is known that in a suspension compression coil spring, a stress which is produced in each part of the wire is generally not constant in a state where a load is applied. In order to reduce the weight of a compression coil spring as described above, it is effective to approximate a stress distribution of a wire to a uniform distribution (i.e., make it flat) as much as possible. As one way of uniforming the stress distribution of a compression coil spring, varying the diameter of a wire in one turn has been proposed, as described in Patent Document 3 (Jpn. Pat. Appln. KOKAI Publication No. 59-219534). In the compression coil spring shown in FIG. 6 of Patent Document 3, for example, an external force acting point is offset in a radial direction of the coil with respect to the coil central axis. Further, a wire diameter on the offset side is reduced.

The inventors of the present invention have carried out intensive study to uniform a stress of a compression coil spring used in the strut-type suspension. As a result, it has been found that when the coil central axis of the compression coil spring is offset to the outer side of the vehicle with respect to the shock absorber, if a wire diameter on the inner side of the vehicle is reduced, variations in the stress distribution of the wire are more significant on the contrary, instead of making the stress distribution more uniform.

BRIEF SUMMARY OF THE INVENTION

Accordingly, an object of the present invention is to provide a strut-type suspension and a suspension compression coil spring whereby a stress distribution of the compression coil spring can be approximated to a uniform distribution.

The strut-type suspension of one embodiment comprises: a lower spring seat; an upper spring seat; a compression coil spring which comprises a wire that is formed into a helical shape, and is arranged in such a state that it is compressed between the lower spring seat and the upper spring seat; and a shock absorber which comprises a cylinder and a rod inserted into the cylinder, and passes through the inside of the compression coil spring, in which the wire of the compression coil spring comprises: a large-diameter wire portion which is arranged more toward an inner side of a vehicle than the shock absorber, and has a wire diameter which is greater than an average wire diameter of the wire; a small-diameter wire portion which is arranged more toward an outer side of the vehicle than the shock absorber, and has a wire diameter which is smaller than the wire diameter of the large-diameter wire portion; and a wire diameter varying portion whose wire diameter is continuously varied between the large-diameter wire portion and the small-diameter wire portion.

According to the embodiment, since the stress distribution of a compression coil spring for use in a strut-type suspension can be approximated to a uniform distribution, the weight of the strut-type suspension compression coil spring can be reduced, which in turn contributes to weight reduction of the vehicle.

According to one embodiment, the compression coil spring is disposed at a position offset to the outer side of the vehicle with respect to the shock absorber, the large-diameter wire portion is provided in a vehicle inner-side portion (i.e., on the counter-offset side) of the compression coil spring, and the small-diameter wire portion is provided in a vehicle outer-side portion (i.e., on the offset side) of the compression coil spring. Also, the lower spring seat comprises: an inner-side spring receiving portion which supports a vehicle inner-side end turn part of an end turn portion at a lower end side of the compression coil spring; and an outer-side spring receiving portion which supports a vehicle outer-side end turn part of the end turn portion at the lower end side, and in which a distance between the outer-side spring receiving portion and the upper spring seat may be smaller than a distance between the inner-side spring receiving portion and the upper spring seat. Also, in a state in which the compression coil spring is compressed between the lower spring seat and the upper spring seat, an amount of compression of the vehicle outer-side portion of the compression coil spring may be greater than an amount of compression of the vehicle inner-side portion.

The suspension compression coil spring according to the present invention is one which comprises a wire that is formed into a helical shape, and is arranged in such a state that it is compressed between a lower spring seat and an upper spring seat of a strut-type suspension, and the suspension compression coil spring comprises: a large-diameter wire portion which is arranged more toward an inner side of a vehicle than a shock absorber, and has a wire diameter which is greater than an average wire diameter of the wire; a small-diameter wire portion which is arranged more toward an outer side of the vehicle than the shock absorber, and has a wire diameter which is smaller than the wire diameter of the large-diameter wire portion; and a wire diameter varying portion whose wire diameter is continuously varied between the large-diameter wire portion and the small-diameter wire portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a longitudinal cross-sectional view of the strut-type suspension shown in FIG. 1;

DETAILED DESCRIPTION OF THE INVENTION

A strut-type suspension according to an embodiment of the present invention will now be described with reference to FIGS. 1 to 4.

Figure 1:
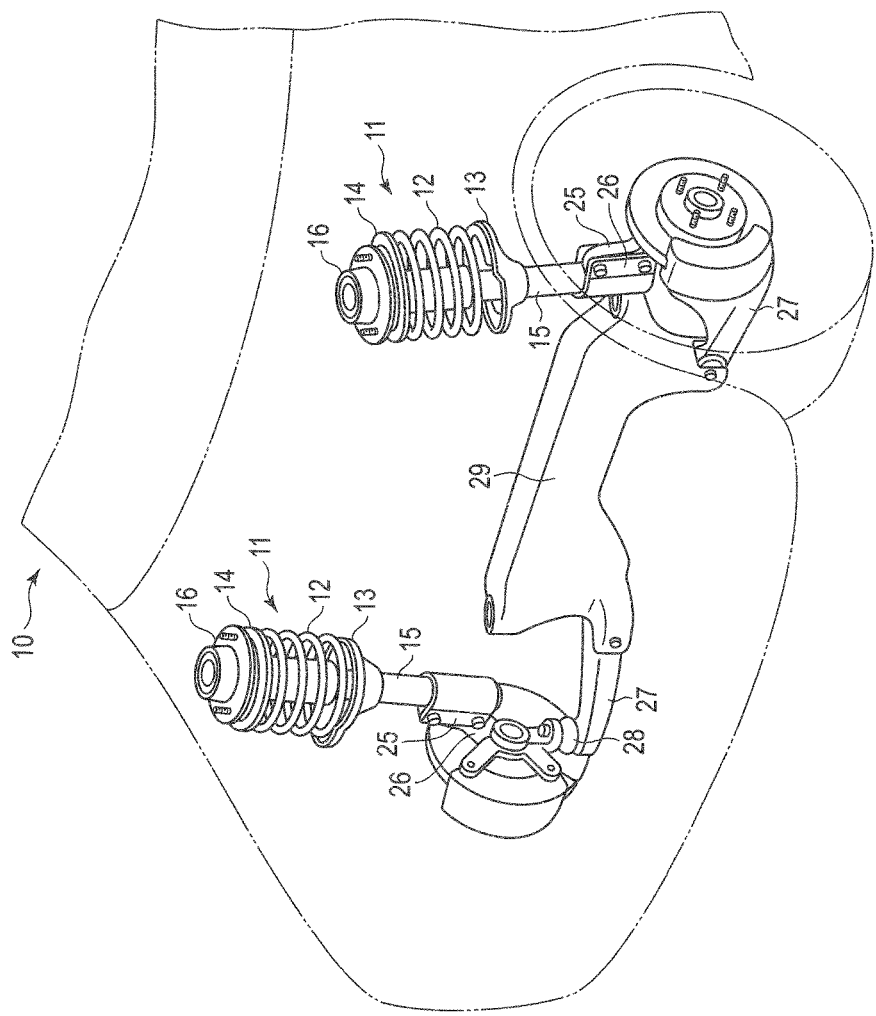
FIG. 1 is a perspective view which schematically shows a part of a vehicle comprising a strut-type suspension according to one embodiment of the present invention.

FIG. 1 shows a strut-type suspension 11 used on the front side of a vehicle 10. FIG. 2 is a cross-sectional view of the strut-type suspension 11. The strut-type suspension 11 comprises a compression coil spring 12, a lower spring seat 13, an upper spring seat 14, a shock absorber (a strut) 15, and a mount insulator 16. The compression coil spring 12 has coil central axis X1 extending longitudinally in the upward and downward directions. The lower spring seat 13 is disposed on the lower end side of the compression coil spring 12. The upper spring seat 14 is disposed on the upper end side of the compression coil spring 12. The shock absorber (strut) 15 passes through the inside of the compression coil spring 12. The mount insulator 16 is provided on the upper end of the suspension 11. The compression coil spring 12 is arranged in such a state that it is compressed between the lower spring seat 13 and the upper spring seat 14.

The shock absorber 15 comprises a cylinder 20, a rod 21, a damping force generation mechanism provided inside the cylinder 20, and a cover member 22. Fluid such as oil is contained in the cylinder 20. The rod 21 is inserted into the cylinder 20. The cover member 22 covers a sliding portion of the rod 21. The rod 21 can be extended and retracted in the direction of axis X2 of the shock absorber 15 relative to the cylinder 20. When the rod 21 and the cylinder 20 move relatively in the direction of axis X2, resistance is produced in the movement of the rod 21 as the damping force generation mechanism is operated.

On a lower end portion of the cylinder 20, a bracket 26 is provided. A knuckle member 25 (FIG. 1) is mounted on the bracket 26. The lower part of the knuckle member 25 is pivotably supported on a lower arm 27 by a ball joint 28. The lower arm 27 is mounted on a cross-member 29 such that it can be moved up and down. The cross-member 29 extends in the width direction of the vehicle 10.

$X_0$ in FIG. 2 represents a vertical line of gravity. X2 represents an axial line of the shock absorber 15. The strut-type suspension 11 is mounted in a vehicle body 30 in such a position that axis X2 of the shock absorber 15 is inclined inwardly by angle $\theta$ with respect to vertical line $X_0$ of gravity. Accordingly, the upper part of the shock absorber 15 is positioned more toward the inner side of the vehicle than the lower part of the same. The mount insulator 16 comprises a vibration-proof rubber 31 and a support member 32 secured to the vehicle body 30. The suspension 11 is swingably mounted on a suspension mounting portion 34 (FIG. 2) by a fixing member 33 such as a bolt. The fixing member 33 is provided on the support member 32. The suspension mounting portion 34 is a part of the vehicle body 30. The suspension 11 is supported to be rotatable about axis X2 by a bearing 35.

The coil central axis X1 of the compression coil spring 12 is disposed at a position offset to the outer side of the vehicle (i.e., the direction indicated by arrow Z in FIG. 2) with respect to axis X2 of the shock absorber 15. In this way, frictional resistance in a slide portion between the cylinder 20 and the rod 21 can be reduced. In FIG. 2, the side opposite to arrow Z is the counter-offset side.

The lower spring seat 13 comprises an inner-side spring receiving portion 13a and an outer-side spring receiving portion 13b. The inner-side spring receiving portion 13a is positioned on the inner side of the vehicle with respect to the width direction of the vehicle 10. The outer-side spring receiving portion 13b is positioned on the outer side of the vehicle. The inner-side spring receiving portion 13a and the outer-side spring receiving portion 13b are different from each other in height. Distance L2 between the outer-side spring receiving portion 13b and the upper spring seat 14 is smaller than distance L1 between the inner-side spring receiving portion 13a and the upper spring seat 14.

Figure 3:
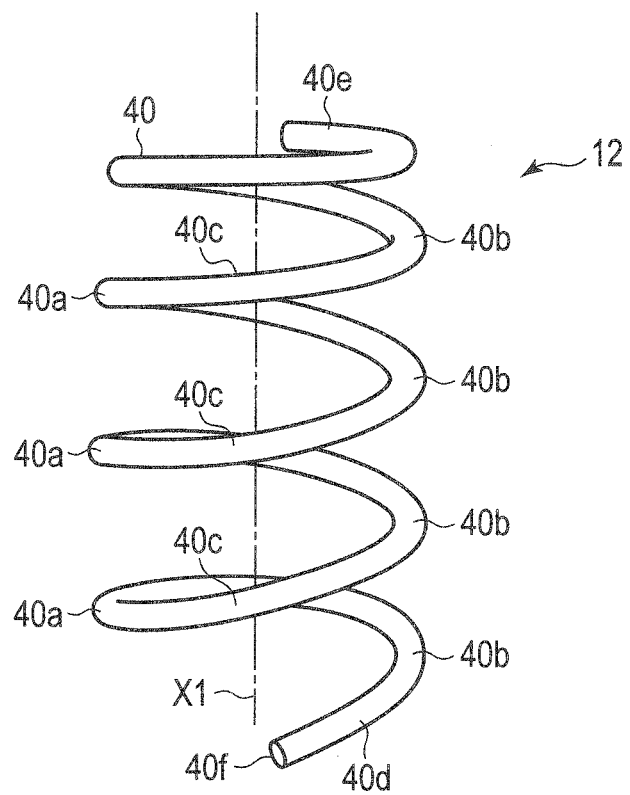
FIG. 3 is a perspective view showing an example of a compression coil spring for use in the strut-type suspension.

FIG. 3 shows the state in which a load along coil central axis X1 is not applied to the compression coil spring 12 (i.e., the so-called free state). In this specification, a length of the compression coil spring 12 in the free state is referred to as a free length. When a load along coil central axis X1 is applied to the compression coil spring 12, the compression coil spring 12 is compressed and bent in the direction of making the length shorter than the free length.

The compression coil spring 12 is mounted in the vehicle body 30 in an assembly state in which it is compressed between the lower spring seat 13 and the upper spring seat 14. In this specification, a length of the compression coil spring 12 in the assembly state is referred to as an assembly height. The amount of compression of a vehicle outer-side portion 12b of the compression coil spring 12 from its free length to the assembly height is greater than the amount of compression of a vehicle inner-side portion 12a from its free length to the assembly height.

The compression coil spring 12 shown in FIG. 3 comprises a wire 40 formed into a helical shape. The wire 40 is formed of spring steel, and its cross-section is circular. An example of the compression coil spring 12 is a cylindrical coil spring. However, according to the specification of the suspension, various forms of compression coil springs, such as a barrel-shaped coil spring, an hourglass coil spring, a tapered coil spring, a variable pitch coil spring, or a coil spring which already has bowing in the free state, may be used.

The type of spring steel to be used as the material of the wire 40 is not particularly limited. However, SAE9254 that conforms to the "Society of Automotive Engineers" in the U.S.A is given as an instance. The chemical components (mass %) of SAE 9254 are C: 0.51 to 0.59, Si: 1.20 to 1.60, Mn: 0.60 to 0.80, Cr: 0.60 to 0.80, S: 0.040 max., P: 0.030 max., and Fe: the remainder. As another example of the steel type, SUP7 conforming to Japanese Industrial Standards (JIS) or the steel type other than the above may be used. When spring steel which is highly resistant to corrosion is used as the material of the wire 40, the chemical components (mass %) are, for instance, C: 0.41, Si: 1.73, Mn: 0.17, Ni: 0.53, Cr: 1.05, V: 0.163, Ti: 0.056, Cu: 0.21, and Fe: the remainder.

The compression coil spring 12 is arranged in such a state that it is compressed between the lower spring seat 13 and the upper spring seat 14. Further, the compression coil spring 12 elastically supports a load applied vertically to the vehicle 10. The wire 40 of the present embodiment includes a large-diameter wire portion 40a and a small-diameter wire portion 40b which are formed alternately in approximately each turn of the wire 40. The large-diameter wire portion 40a is arranged in the vehicle inner-side portion 12a of the compression coil spring 12 (i.e., on the counter-offset side of the compression coil spring) with respect to the width direction of the vehicle. Wire diameter d1 of the large-diameter wire portion 40a is greater than the average wire diameter of an effective portion of the wire 40.

In contrast, the small-diameter wire portion 40b is arranged in the vehicle outer-side portion 12b of the compression coil spring 12 (i.e., on the offset side of the compression coil spring) with respect to the width direction of the vehicle. Wire diameter d2 of the small-diameter wire portion 40b is smaller than wire diameter d1 of the large-diameter wire portion 40a. A wire diameter varying portion 40c whose wire diameter is gradually and continuously varied (for example, to be tapered) between wire diameter d1 of the large-diameter wire portion 40a and wire diameter d2 of the small-diameter wire portion 40b is formed between the large-diameter wire portion 40a and the small-diameter wire portion 40b. Wire diameters of an end turn portion 40d at the lower end side of the compression coil spring 12 and an end turn portion 40e at the upper end side of the compression coil spring 12 are smaller than the wire diameter of the effective portion, and take the minimum value, respectively.

The end turn portion 40d at the lower end side contacts an upper surface of the lower spring seat 13. In the lower spring seat 13, the inner-side spring receiving portion 13a and the outer-side spring receiving portion 13b are formed. As described above, the inner-side spring receiving portion 13a and the outer-side spring receiving portion 13b are different from each other in height. The inner-side spring receiving portion 13a supports the vehicle inner-side end turn part of the end turn portion 40d at the lower end side. The outer-side spring receiving portion 13b supports the vehicle outer-side end turn part of the end turn portion 40d at the lower end side. The end turn portion 40e at the upper end side contacts a lower surface of the upper spring seat 14.

Figure 4:
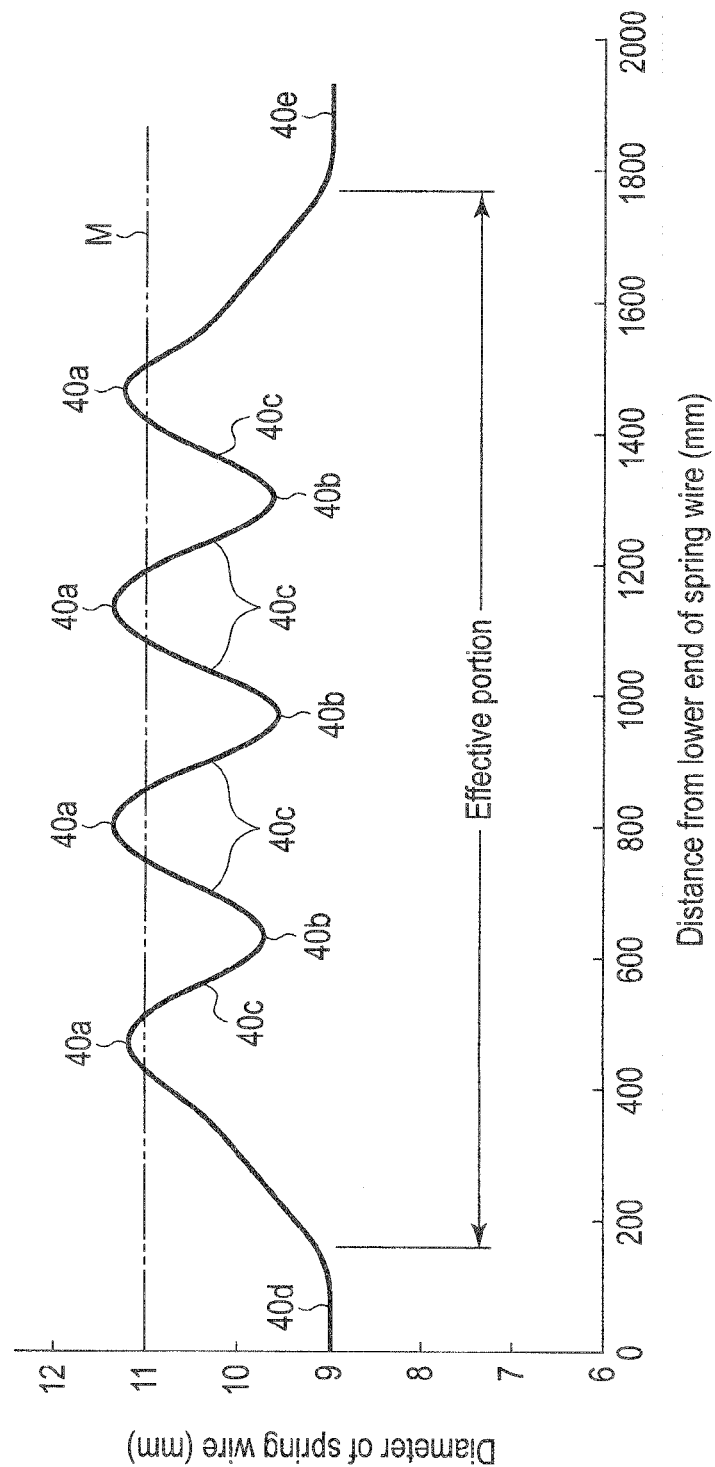
FIG. 4 is an illustration showing the relationship between a distance from a lower end of a wire of the compression coil spring shown in FIG. 3 and a diameter of the wire.

FIG. 4 shows an example of the relationship between a distance from a lower end 40f (FIG. 3) of the wire 40 and the wire diameter. As shown in FIG. 4, the wire diameter is varied in accordance with a position of turns from the lower end 40f. That is, in the effective portion of the wire 40, the large-diameter wire portion 40a, which takes the maximum value of wire diameter on the inner side of the vehicle, and the small-diameter wire portion 40b, which takes the minimum value of wire diameter on the outer side of the vehicle, are alternately formed in approximately each turn. In the example shown in FIG. 4, the maximum value of the large-diameter wire portion 40a is 11.2 to 11.5 mm, the minimum value of the small-diameter wire portion 40b is 9.6 to 9.8 mm, and the average wire diameter of the effective portion is 10.5 mm. The wire diameter of the wire diameter varying portion 40c is continuously varied between the maximum value of the wire diameter and the minimum value of the wire diameter for approximately each turn of the effective portion of the wire 40. Each of the wire diameters of the end turn portions 40d and 40e is 9 mm, which is the minimum value. Two-dot chain line M in FIG. 4 represents a conventional coil spring having a constant wire diameter.

The wire 40 of the present embodiment has its diameter varied continuously in the longitudinal direction. The wire 40 whose diameter is varied as described above can be formed by a machine processing such as cutting, diameter reduction (a type of forging) by a swaging machine, or plastic working such as a press. In the case of cutting processing, there are problems such as a boundary portion, which causes stress concentration, being created in a portion in which the wire diameter is varied, or a metal flow of a metal structure being broken by the cutting. In contrast, by adopting the swaging processing, the problem caused by the cutting processing can be avoided, and it is possible to form a portion in which the wire diameter is varied to be smooth and continuous. Note that the large-diameter wire portion 40a, the small-diameter wire portion 40b, the wire diameter varying portion 40c, and the end turn portions 40d and 40e can be formed even by a dieless working apparatus which draws a material between a supply-side roller and a draw-side roller.

The wire 40 which has been processed by these processing means is formed into a helical shape by a bending process (for example, a hot coiling process). Further, after performing heat treatment such as annealing and shot peening, adjustment such as setting is performed as necessary, and then coating and quality inspection are performed before a product is completed. The compression coil spring 12 is mounted on the shock absorber 15 in a state in which the compression coil spring 12 is compressed between the spring seats 13 and 14 and a preload is applied, and is further arranged in the vehicle body 30.

A vertical load is applied to the strut-type suspension 11 which is provided in the vehicle 10 in this way. The compression coil spring 12 is further compressed and bent between the lower spring seat 13 and the upper spring seat 14 in accordance with the above-mentioned load. In accordance with the amount of compression from the assembly height of the compression coil spring 12, the shock absorber 15 is extended and retracted in the direction of axis X2, and a distance between the lower spring seat 13 and the upper spring seat 14 is varied in accordance with the load. However, the attitudes of the spring seats 13 and 14 can be kept constant even if the amount of compression of the compression coil spring 12 is varied. Accordingly, in the compression coil spring 12 mounted between the spring seats 13 and 14, each of the vehicle inner-side portion 12*a* and the vehicle outer-side portion 12*b* is compressed by substantially the same stroke in accordance with the load.

The compression coil spring 12 of the present embodiment includes the large-diameter wire portion 40*a* in the vehicle inner-side portion 12*a* (i.e., on the counter-offset side of the compression coil spring 12), and the small-diameter wire portion 40*b* in the vehicle outer-side portion 12*b* (i.e., on the offset side of the compression coil spring). By forming the compression coil spring 12 as described, a stress distribution of the wire 40 which is compressed between the spring seats 13 and 14 can be approximated to a uniform distribution. Further, as compared to a conventional product whose wire diameter is constant, the weight of the compression coil spring 12 can be reduced.

As an example, in a conventional compression coil spring, the wire diameter is 11.0 mm, the total number of turns is 5.39, the spring constant is 33.3 N/mm, and the weight is 2.09 kg, whereas in the compression coil spring 12 of the present embodiment, wire diameter d1 of the large-diameter wire portion 40*a* is 11.3 mm, wire diameter d2 of the small-diameter wire portion 40*b* is 9.7 mm, the average wire diameter is 10.5 mm, the total number of turns is 4.93, the spring constant is 33.3 N/mm, and the weight is 1.79 kg. Thus, a weight reduction of 14.4% as compared to the conventional product is enabled.

Needless to say, in carrying out the present invention, in addition to the specific shape and dimension, the number of turns, the material (steel type), and the spring constant of the compression coil spring, the form, the structure, the arrangement and the like of each of the elements which constitute the strut-type suspension (for example, the shock absorber, the upper and lower spring seats, etc.) may be modified variously.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A strut suspension comprising:
   a lower spring seat;
   an upper spring seat;
   a compression coil spring which comprises a wire that is formed into a helical shape, and which is arranged in such a state that it is compressed between the lower spring seat and the upper spring seat; and
   a shock absorber which comprises a cylinder and a rod that is inserted into the cylinder, the shock absorber passing through an inside of the compression coil spring,
   wherein a coil central axis of the compression coil spring is offset to an outer side of a vehicle with respect to an axis of the shock absorber, and
   wherein the wire of the compression coil spring comprises:
      a plurality of counter-offset-side large-diameter wire portions which are arranged more toward an inner side of the vehicle than the axis of the shock absorber, wherein each of the plurality of counter-offset-side large-diameter wire portions has a wire diameter that is greater than an average wire diameter of the wire, and wherein maximum values of the wire diameters of the plurality of counter-offset-side large-diameter wire portions differ from each other;
      a plurality of offset-side small-diameter wire portions which are arranged more toward the outer side of the vehicle than the axis of the shock absorber, wherein each of the plurality of offset-side small-diameter wire portions has a wire diameter that is smaller than the wire diameters of the plurality of counter-offset-side large-diameter wire portions, and wherein minimum values of the wire diameters of the plurality of offset-side small-diameter wire portions differ from each other;
      a plurality of wire diameter varying portions having wire diameters that are continuously varied between the plurality of counter-offset-side large-diameter wire portions and the plurality of offset-side small-diameter wire portions;
      a lower-end-side end turn portion whose wire diameter is smaller than the minimum values of the wire diameters of the plurality of offset-side small-diameter wire portions, wherein the lower-end-side end turn portion contacts an upper surface of the lower spring seat; and
      an upper-end-side end turn portion whose wire diameter is smaller than the minimum values of the wire diameters of the plurality of offset-side small-diameter wire portions, wherein the upper-end-side end turn portion contacts a lower surface of the upper spring seat.

2. The strut suspension of claim 1, wherein:
   the lower spring seat comprises an inner-side spring receiving portion which supports a vehicle inner-side end turn part of the lower-end-side end turn portion of the compression coil spring, and an outer-side spring receiving portion which supports a vehicle outer-side end turn part of the lower-end-side end turn portion; and
   a distance between the outer-side spring receiving portion and the upper spring seat is smaller than a distance between the inner-side spring receiving portion and the upper spring seat.

3. The strut suspension of claim 1, wherein an amount of compression of a vehicle outer-side portion of the compression coil spring is greater than an amount of compression of a vehicle inner-side portion in a state in which the compression coil spring is compressed between the lower spring seat and the upper spring seat.

4. The strut suspension of claim 2, wherein an amount of compression of a vehicle outer-side portion of the compression coil spring is greater than an amount of compression of a vehicle inner-side portion in a state in which the compression coil spring is compressed between the lower spring seat and the upper spring seat.

5. A suspension compression coil spring which comprises a wire that is formed into a helical shape, and which is arranged in such a state that it is compressed between a lower spring seat and an upper spring seat of a strut suspension,
   wherein a coil central axis of the compression coil spring is offset to an outer side of a vehicle with respect to an axis of a shock absorber, and
   wherein the wire comprises:
      a plurality of counter-offset-side large-diameter wire portions which are arranged more toward an inner side of the vehicle than the axis of the shock absorber, wherein each of the plurality of counter-offset-side large-diameter wire portions has a wire diameter that is greater than an average wire diameter of the wire, and wherein maximum values of the wire diameters of the plurality of counter-offset-side large-diameter wire portions differ from each other;

a plurality of offset-side small-diameter wire portions which are arranged more toward the outer side of the vehicle than the axis of the shock absorber, wherein each of the plurality of offset-side small-diameter wire portions has a wire diameter that is smaller than the wire diameters of the plurality of counter-offset-side large-diameter wire portions, and wherein minimum values of the wire diameters of the plurality of offset-side small-diameter wire portions differ from each other;

a plurality of wire diameter varying portions having wire diameters that are continuously varied between the plurality of counter-offset-side large-diameter wire portions and the plurality of offset-side small-diameter wire portions;

a lower-end-side end turn portion whose wire diameter is smaller than the minimum values of the wire diameters of the plurality of offset-side small-diameter wire portions, wherein the lower-end-side end turn portion contacts an upper surface of the lower spring seat; and an upper-end-side end turn portion whose wire diameter is smaller than the minimum values of the wire diameters of the plurality of offset-side small-diameter wire portions, wherein the upper-end-side end turn portion contacts a lower surface of the upper spring seat.

\* \* \* \* \*